US011688863B2

(12) United States Patent
Choi et al.

(10) Patent No.: US 11,688,863 B2
(45) Date of Patent: Jun. 27, 2023

(54) FUEL CELL SYSTEM

(71) Applicant: MICO POWER LTD., Anseong-si (KR)

(72) Inventors: Song Ho Choi, Hwaseong-si (KR); Byoung Chang Yang, Seoul (KR)

(73) Assignee: MICO POWER LTD., Anseong-si (KR)

( * ) Notice: Subject to any disclaimer, the term of this patent is extended or adjusted under 35 U.S.C. 154(b) by 124 days.

(21) Appl. No.: 16/097,925

(22) PCT Filed: May 23, 2017

(86) PCT No.: PCT/KR2017/005328
§ 371 (c)(1),
(2) Date: Oct. 31, 2018

(87) PCT Pub. No.: WO2017/204520
PCT Pub. Date: Nov. 30, 2017

(65) Prior Publication Data
US 2019/0148744 A1 May 16, 2019

(30) Foreign Application Priority Data
May 24, 2016 (KR) .................. 10-2016-0063209

(51) Int. Cl.
*H01M 8/04089* (2016.01)
*H01M 8/04302* (2016.01)
(Continued)

(52) U.S. Cl.
CPC ... *H01M 8/04089* (2013.01); *H01M 8/04302* (2016.02); *H01M 8/04365* (2013.01);
(Continued)

(58) Field of Classification Search
CPC .......... H01M 8/04089; H01M 8/04302; H01M 8/04365; H01M 8/04373; H01M 8/04701;
(Continued)

(56) References Cited

U.S. PATENT DOCUMENTS

2005/0089732 A1* 4/2005 Aoyama ............. H01M 8/0662
429/413
2007/0190375 A1* 8/2007 Gorobinskiy .......... B01J 8/0285
429/412
(Continued)

FOREIGN PATENT DOCUMENTS

KR 10-2004-0014408 A 2/2004
KR 2011-0077775 A 7/2011
(Continued)

OTHER PUBLICATIONS

English translation of Description of Bae et al. KR20140032535A obtained from Espacenet.*
(Continued)

*Primary Examiner* — Jimmy Vo
(74) *Attorney, Agent, or Firm* — Sughrue Mion, PLLC

(57) ABSTRACT

A fuel-cell system is disclosed. The fuel cell system includes: a system module having one or more fuel-cell stacks, a first reformer for converting at least some of hydrocarbon fuel into hydrogen, and supplying the hydrogen to the fuel-cell stacks, and a housing for receiving the fuel-cell stacks, and the first reformer therein; and a start-up module disposed outside the housing, and removably coupled to the system module, wherein the start-up module supplies hydrogen-containing fuel to the fuel-cell stacks until a temperature of the fuel-cell stack reaches a predetermined temperature.

17 Claims, 3 Drawing Sheets

(51) Int. Cl.
  *H01M 8/0612* (2016.01)
  *H01M 8/0432* (2016.01)
  *H01M 8/249* (2016.01)
  *H01M 8/124* (2016.01)
  *H01M 8/14* (2006.01)
  *H01M 8/04701* (2016.01)
  *H01M 8/12* (2016.01)

(52) U.S. Cl.
  CPC ... *H01M 8/04373* (2013.01); *H01M 8/04701* (2013.01); *H01M 8/0612* (2013.01); *H01M 8/0618* (2013.01); *H01M 8/124* (2013.01); *H01M 8/14* (2013.01); *H01M 8/249* (2013.01); *H01M 2008/1293* (2013.01); *H01M 2008/147* (2013.01); *Y02E 60/50* (2013.01); *Y02P 70/50* (2015.11)

(58) Field of Classification Search
  CPC .. H01M 8/0612; H01M 8/0618; H01M 8/124; H01M 8/14; H01M 8/249; H01M 2008/1293; H01M 2008/147
  See application file for complete search history.

(56) References Cited

U.S. PATENT DOCUMENTS

2008/0248342 A1* 10/2008 Takahashi ............ H01M 8/2484
  429/415
2011/0159386 A1* 6/2011 Kaupert ............ H01M 8/04302
  429/423
2012/0028143 A1* 2/2012 Akagi ............... H01M 8/04223
  429/423
2013/0126038 A1* 5/2013 Jamal ........................ C01B 3/48
  141/5
2015/0137044 A1* 5/2015 Finnerty .................. B01J 4/001
  422/627
2015/0188174 A1* 7/2015 Iwakiri ............. H01M 8/04225
  429/415
2016/0064747 A1* 3/2016 Tsukamoto ......... H01M 8/0675
  429/410
2016/0149244 A1* 5/2016 Abe ........................ B01J 19/24
  429/410

FOREIGN PATENT DOCUMENTS

| KR | 2011-0137399 A | 12/2011 |
| KR | 10-2014-0014950 A | 2/2014 |
| KR | 10-2014-0032535 A | 3/2014 |

OTHER PUBLICATIONS

International Search Report for PCT/KR2017/005328 dated Aug. 24, 2017 [PCT/ISA/210].

* cited by examiner

[FIG. 1]
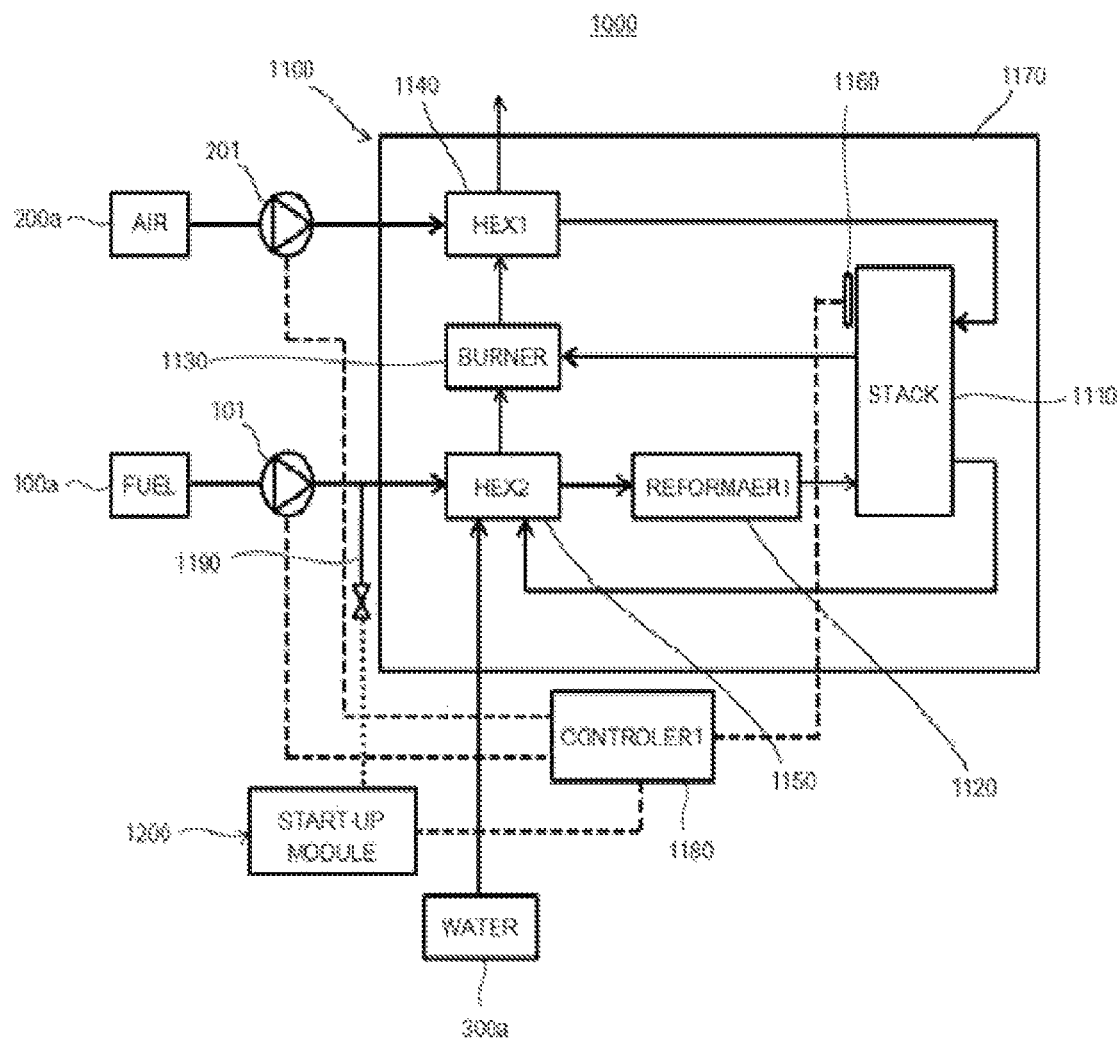

[FIG. 2]
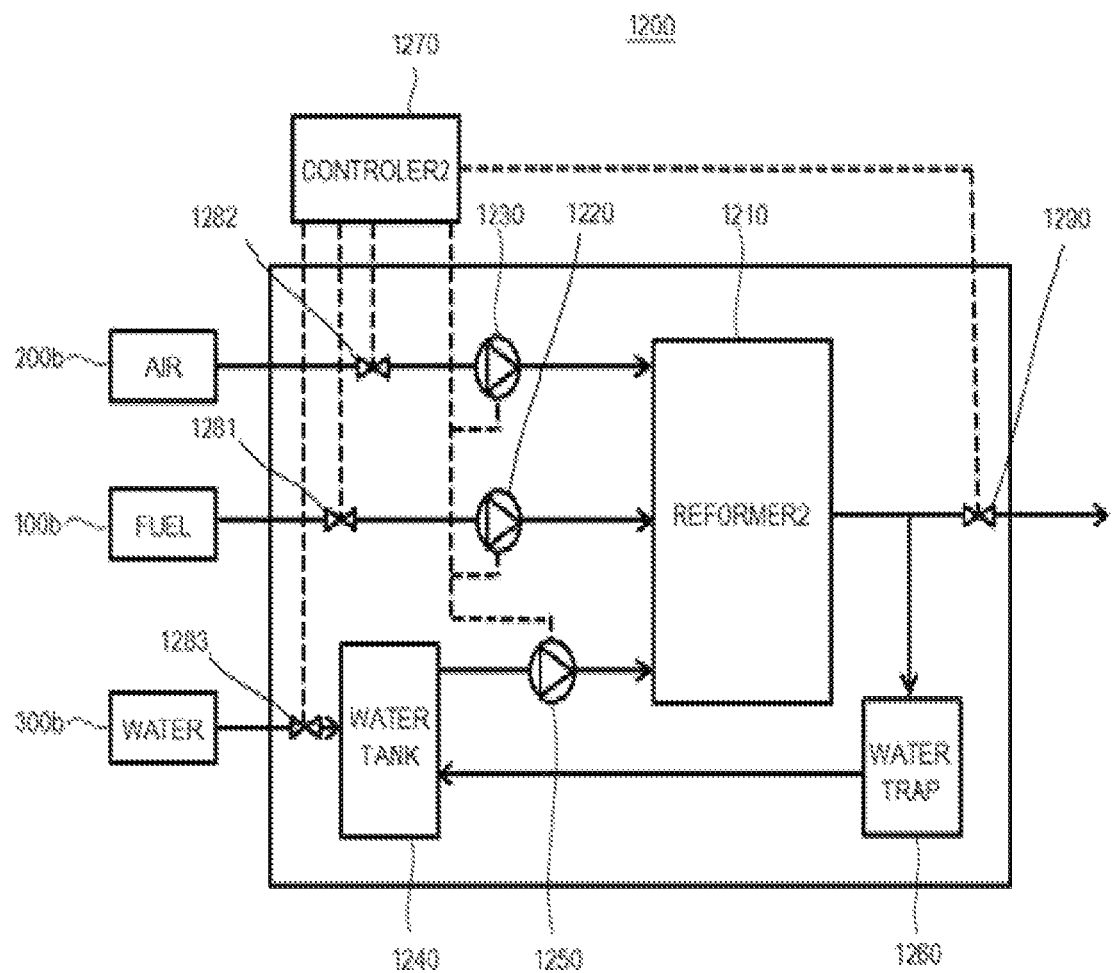

[FIG. 3]
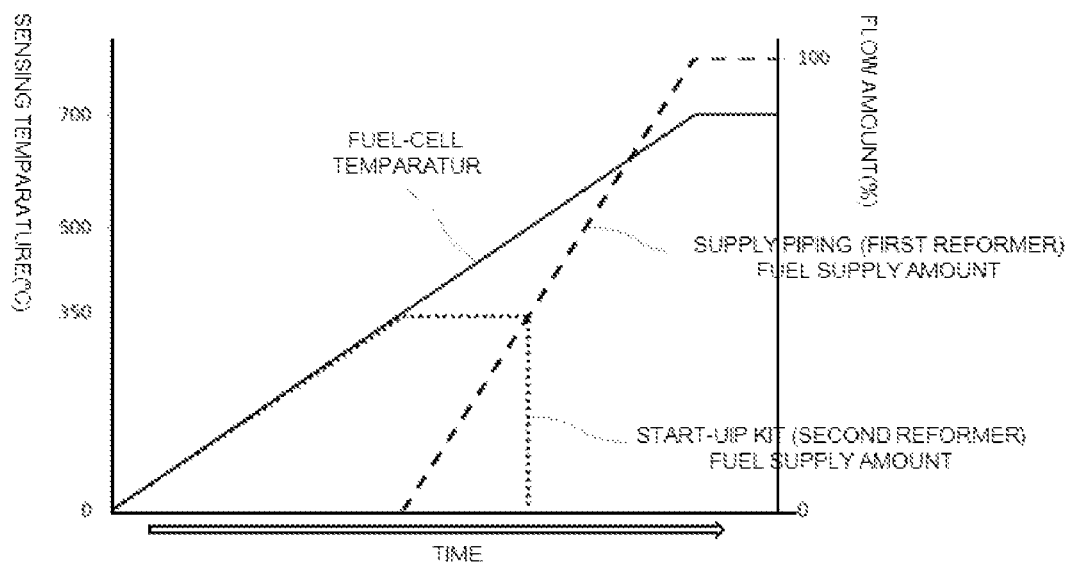

FUEL CELL SYSTEM

CROSS-REFERENCE TO RELATED APPLICATION

This application is a National Stage of International Application No. PCT/KR2017/005328 filed May 23, 2017, claiming priority based on Korean Application No. 10-2016-0063209 filed May 24, 2016, the entire content of which is incorporated herein by reference for all purposes as if fully set forth herein.

BACKGROUND

Field of the Present Disclosure

The present disclosure relates to a fuel-cell system, and more specifically to a fuel-cell system operating at high temperatures.

Discussion of Related Art

A fuel cell, which generates electricity via an electrochemical reaction between hydrogen and oxygen, is being actively studied because of its simple energy conversion step, and its environment-friendly characteristic of being a high efficiency and pollution-free generator.

In particular, as a fuel cell operated at a high temperature of about 600° C. to 1000° C. using ceramics as an electrolyte, a solid oxide fuel-cell (SOFC) among the fuel-cells has a number of advantages. In this connection, the solid oxide fuel-cell (SOFC) is the most efficient and pollution-less fuel cell among other types of fuel cells such as molten carbonate fuel-cell (MCFC), phosphoric acid fuel cell (PAFC), polymer fuel cell (PEFC), and the like. In addition, in the solid oxide fuel-cell (SOFC), combined power generation is possible without need for a fuel reformer.

However, in a case of high-temperature fuel-cell system such as the solid oxide fuel-cell, etc., since an operating temperature is in a range of about 600° C. to 1000° C., a system component such as a fuel-cell stack, a reformer, and the like should be heated at an early stage up to the temperature at which electric energy may be generated. Such initial heating of the system generally requires several hours in consideration of thermal shock, and the like of the system.

Meanwhile, in order to prevent an anode of the solid oxide fuel cell from being oxidized during the initial operation of the system for heating, it is required to make an anode electrode chamber into a reducing atmosphere. However, when the system is consisting of a steam reformer for reforming hydrocarbon fuel via an endothermic reaction, a reforming reaction by the reformer rarely occurs in an initial low-temperature operating state, thus the anode chamber cannot be made into the reducing atmosphere.

Therefore, in recent years, with respect to the fuel-cell system operating at high temperatures, various studies have been conducted for an initial start-up operation for heating the system to a temperature at which the electric energy may be generated for a high-temperature fuel cell system.

SUMMARY

A purpose of the present disclosure is to provide a fuel-cell system having a system module and a start-up module removably coupled to the start-up module in order to prevent an oxidation of an anode of the fuel-cell during a start-up mode, and to reduce a volume of the system.

In one aspect of the present disclosure, there is provided a fuel-cell system including: a system module having one or more fuel-cell stacks, a first reformer for converting at least some of hydrocarbon fuel into hydrogen, and supplying the hydrogen to the fuel-cell stacks, and a housing for receiving the fuel-cell stacks, and the first reformer therein; and a start-up module disposed outside the housing, and removably coupled to the system module, wherein the start-up module supplies hydrogen-containing fuel to the fuel-cell stacks until a temperature of the fuel-cell stack reaches a predetermined temperature.

In one embodiment, each of the fuel-cell stacks may include a solid oxide fuel-cell (SOFC) stack or a molten carbonate fuel-cell (MCFC) stack, and the predetermined temperature for the fuel-cell stacks may be in a range of 300° C. to 500° C.

In one embodiment, the start-up module may include a second reformer for producing hydrogen from hydrocarbon fuel via an exothermic reaction or a balanced reaction. For example, the second reformer may include one selected from a group consisting of a steam reformer, a partial oxidation reformer, a catalytic partial oxidation reformer, and an auto-thermal reformer. In this case, the start-up module may further include a fuel supply device for supplying the hydrocarbon fuel to the second reformer, and an air supply device for supplying air to the second reformer.

In one embodiment, the second reformer may include the steam reformer or the auto-thermal reformer. In this case, the start-up module may further include a water tank for supplying steam to the second reformer, and a steam collector for collecting steam from hydrogen-containing fuel discharged from the second reformer.

In one embodiment, the system module may further include a temperature sensor for sensing a temperature of the fuel-cell stacks or the first reformer, and a first controller disposed outside the housing and controlling an operation of the fuel-cell stacks based on the temperature sensed by the temperature sensor. In addition, the start-up module may further include a second controller for controlling an amount of fuel supplied to the fuel-cell stacks based on a control signal of the first controller.

In one embodiment, the system module may further include a connection pipe branched from a portion of a piping located outside the housing, in this regard, the piping connects an external fuel supply unit and the first reformer. In this case, a discharge piping for discharging the hydrogen-containing fuel from the start-up module may be removably coupled to the connection pipe. In one example, each of the connection pipe and the discharge piping is provided with each valve for opening and closing each of the connection pipe and the discharge piping.

According to the fuel-cell system based on the embodiment of the present disclosure, the start-up module having the second reformer capable of reforming fuel at low temperatures allows the hydrogen-containing fuel to be supplied to the fuel-cell stack during the certain initial period of the start-up mode of the system module. Thus, the anode of the fuel-cell stack may be prevented from being oxidized during the start-up mode. In addition, configuring the start-up module independently so as to be removable from the system module may allow a volume and manufacturing cost of the system module to be reduced compared to a case of having two reformers in the system module and may allow a maintenance of the fuel-cell system to be improved. Further, the volume reduction may allow a heat dissipation efficiency of the heat generated from the fuel-cell stack to be improved.

BRIEF DESCRIPTION OF THE DRAWINGS

FIG. 1 is a block diagram illustrating a fuel-cell system according to an embodiment of the present disclosure.

FIG. 2 is a block diagram illustrating the start-up module shown in FIG. 1.

FIG. 3 is a graph illustrating an operating method of a fuel-cell system according to an embodiment of the present disclosure.

DETAILED DESCRIPTIONS

Hereinafter, a stack structure for a fuel-cell according to an embodiment of the present disclosure will be described in detail with reference to the accompanying drawings. The embodiments according to this inventive concept may be variously modified and may have multiple forms. Thus, specific embodiments are illustrated in the drawings or described in detail in this specification or application. It will be understood that the description herein is not intended to limit the claims to the specific embodiments described. On the contrary, it is intended to cover alternatives, modifications, and equivalents as may be included within the spirit and scope of the present disclosure as defined by the appended claims. In the following figures, like reference numbers refer to similar elements throughout the figures. In the appended drawings, the dimensions of the structures are shown enlarged to illustrate the present disclosure for clarity.

It will be understood that, although the terms "first", "second", and so on may be used herein to describe various components, these components should not be limited by these terms. These terms are used to distinguish one component from another component. For example, a first element could be termed a second element, and, similarly, a second element could be termed a first element, without departing from the scope of example embodiments of the present invention.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In this specification, a "start-up mode" of a high-temperature operating fuel-cell stack refers to an operation state in which the fuel-cell stack is being heated from a temperature of an initial operation state of the fuel-cell stack to a temperature required for normal power generation. In addition, a "power generation mode" refers to an operation state in which the fuel-cell stack is performing the normal power generation after the temperature of the fuel-cell stack has been increased to the temperature required for the normal power generation.

FIG. 1 is a block diagram illustrating a fuel-cell system according to an embodiment of the present disclosure. In addition, FIG. 2 is a block diagram illustrating the start-up module shown in FIG. 1.

With reference to FIG. 1 and FIG. 2, a fuel-cell system 1000 according to an embodiment of the present disclosure includes a system module 1100 and a start-up module 1200.

The system module 1100 includes a fuel cell stack 1110, a first reformer 1120, a burner 1130, a first heat exchanger 1140, a second heat exchanger 1150, a temperature sensor 1160, a housing 1170, and a first controller 1180.

The fuel-cell stack 1110 may include one or more fuel-cell stacks operating at high temperatures. For example, the fuel-cell stacks 1110 may include one or more solid oxide fuel-cell (SOFC) stacks or molten carbonate fuel-cell (MCFC) stacks operating at temperatures above about 500° C. In this connection, the fuel-cell stack 1110 may be a stack of planar single cells, or a bundle of cylindrical or planar single cells.

The fuel-cell stack 1110 generates electrical energy using oxygen in air, and hydrogen of reformed fuel gas. A reaction between the oxygen and the hydrogen is an exothermic reaction in which the fuel-cell stack 1110 may emit heat while generating the electrical energy.

The first reformer 1120 may convert at least some of hydrocarbon fuel supplied from an external fuel supply unit 100a via the external first fuel supply unit 101 into hydrogen. The first reformer 1120 may be selected from a group consisting of a steam reformer that converts the hydrocarbon fuel into hydrogen using steam as an oxidant, a partial oxidation reformer that converts the hydrocarbon fuel into hydrogen using oxygen as an oxidant, an auto-thermal reformer that converts the hydrocarbon fuel into hydrogen using both steam and oxygen as oxidants, a catalytic partial oxidation reformer that converts the hydrocarbon fuel into hydrogen via partial oxidation using catalytic, and the like. While a steam reforming reaction in the steam reformer is an endothermic reaction, each of a partial oxidation reforming reaction and a catalytic partial oxidation reforming reaction in each of the partial oxidation reformer and the catalytic partial oxidation reformer are exothermic reactions, and an auto-thermal reforming reaction in the auto-thermal reformer is a balanced reaction.

In one embodiment, the first reformer 1120 may be the steam reformer. This is because the steam reformer may utilize the heat generated from the fuel-cell stack 1110, which is included in the system module 1100 and operates at high-temperatures. In addition, this is also because the steam reforming reaction may produce more hydrogen from the same amount of the hydrocarbon fuel. In this case, the first reformer 1120 may convert at least some of the fuel into hydrogen via reacting steam generated by heating water supplied from a water supply unit 300a provided inside or outside the system module 1100 with fuel supplied from the external fuel supply unit 100a.

In one embodiment, after a temperature of the fuel-cell stack 1110 reaches a certain temperature, the first reformer 1120 may reform the fuel supplied from the fuel supply unit 100a and supply the reformed fuel to the fuel-cell stack 1110. For example, before the temperature of the fuel-cell stack 1110 reaches a temperature of about 600° C. to 700° C. for a power generation mode, and after a temperature of the fuel-cell stack 1110 reaches a predetermined temperature, for example, about 300° C. to 500° C., the first reformer 1120 may supply the reformed fuel to the fuel-cell stack 1110. In this case, for a period in which the fuel-cell stack 1110 is at a certain temperature, both the fuel supplied from the fuel supply unit 100a and reformed by the first reformer 1120 and the reformed fuel supplied from the start-up module 1200 may be supplied to the fuel-cell stack 1110.

In another embodiment, the first reformer 1120 may reform the fuel supplied from the fuel supply unit 100a and provide the reformed fuel to the fuel-cell stack 1110 for a duration from the initial period of the start-up mode of the system module 1100 to the power generation mode. In an initial interval of the start-up mode of the system module 1100, both the fuel supplied from the fuel supply unit 100a and reformed by the first reformer 1120, and the reformed fuel supplied from the start-up module 1200 may be supplied to the fuel-cell stack 1110.

The fuel-cell stack 1110 generates electrical energy using hydrogen-containing fuel provided from the first reformer 1120 and the start-up module 1200, and oxygen-containing air supplied from an external air supply 200b. The air supplied from the air supply unit 200b via an external first air supply device 201 is preferably heated to a certain temperature or higher before being supplied to the fuel-cell stack 1110.

The burner 1130 and the first heat exchanger 1140 may heat the air supplied from the air supply unit 200a to the fuel-cell stack 1110. In one embodiment, the burner 1130 may burn unreacted discharged fuel of the fuel supplied to the fuel-cell stack 1110 to generate high temperature burnt gas. In addition, the first heat exchanger 1140 may heat the air supplied from the air supply unit 200a through heat exchange using the high temperature burnt gas supplied from the burner 1130, and then supply the heated air to the fuel-cell stack 1110.

In this connection, the system module 1100 may include a second heat exchanger 1150 for heating the fuel supplied from the fuel supply unit 100a through heat exchange using the high temperature discharged gas discharged from the fuel-cell stack 1110 in the power generation mode, and then supplying the heated fuel to the first reformer 1120.

The temperature sensor 1160 may be disposed adjacent to the fuel-cell stack 1110 to sense a temperature of the fuel-cell stack 1110. Alternatively, the temperature sensor 1160 may be disposed adjacent to the first reformer 1120 to sense a temperature of the first reformer 1120.

The housing 1170 may house the fuel-cell stack 1110, the first reformer 1120, the burner 1130, the first and second heat exchangers 1140, 1150, the temperature sensor 1160, and the like. Further, the housing 1170 may include an insulating wall to prevent internal heat from being released to the exterior.

The first controller 1180 may be disposed outside the housing 1170, and may be electrically connected to the first fuel supply device 101, the first air supply device 201, the temperature sensor 1160, and the second controller 1270 of the start-up module 1200 to control their operations. In one embodiment, the first controller 1180 may regulate the amount of fuel and the amount of air to be supplied to the fuel-cell stack 1110 by being electrically connected to the first fuel supply device 101, the first air supply device 201, and the temperature sensor 1160, and by controlling the operations of the fuel supply device 101 and the air supply device 201 based on the temperature of the first reformer 1120. Further, the first controller 1180 may be electrically connected to the second controller 1270 to control an operation of the start-up module 1200.

The start-up module 1200 may be disposed outside the housing 1170, and removably coupled to the system module 1100. In addition, the start-up module 1200 may supply the reformed hydrogen-containing fuel to the fuel-cell stack 1110 of the system module 1100 during an initial period of the start-up mode of the system module 1100. For example, the start-up module 1200 may supply the reformed fuel to the fuel-cell stack 1110 from the initial period of the start-up mode of the system module 1100 to the temperature of the fuel-cell stack 1110 reaches about 300° C. to 500° C.

In one embodiment the start-up module 1200 may include a second reformer 1210, a second fuel supply device 1220, a second air supply device 1230, and a second controller 1270.

The second reformer 1210 may be one selected from a group consisting of a steam reformer for reforming fuel via an endothermic reaction, a partial oxidation reformer for reforming the fuel even at low temperatures via an exothermic reaction or a balanced reaction, a catalytic partial oxidation reformer, auto-thermal reformer, and the like.

In one embodiment, when the second reformer 1210 includes the partial oxidation reformer or the catalytic partial oxidation reformer, the second reformer 1210 may react fuel supplied form an external fuel supply unit 100b via a second fuel supply device with oxygen supplied from an external air supply unit 200b by a second air supply device 1230 to convert the fuel into hydrogen. In FIG. 2, the second fuel supply device 1220, and the second air supply device 1230 are shown as components of the start-up module 1200, but the start-up module 1200 may not include the fuel supply device 1220, and the air supply device 1230. For example, the second reformer 1210 may be supplied with fuel and air using an external pump and a blower that are removably attached to the start-up module 1200.

In another embodiment, when the second reformer 1210 includes the steam reformer or the auto-thermal reformer, the start-up module 1200, as shown in FIG. 2, may further include a water tank 1240 for supplying steam to the second reformer 1210, a water pump 1250 for supplying water stored in the water tank 1240 to the second reformer 1210, and a steam collector 1260 for collecting steam from the fuel discharged from the second reformer 1210. In addition, the second reformer 1210 may react hydrocarbon fuel, oxygen, and steam supplied from the fuel supply unit 100b, the air supply unit 200b, and the water tank 1240, and may generate hydrogen from at least some of the hydrocarbon fuel.

The second controller 1270 may regulate the amount of the fuel, the air, and the steam supplied to the second reformer 1210 by being electrically connected to the second fuel supply device 1220, the second air supply device 1230, and the water pump 1250 to control their operations. In addition, the second controller 1270 may be electrically connected to a first valve 1281 installed at a piping connected to the external fuel supply unit 100b, a second valve 1282 installed at a piping connected to the external air supply unit 200b, a third valve 1290 installed at a piping directly coupled to the system module 1100 to supply the fuel reformed by the second reformer 1210 to the system module 1100, and a fourth valve 1283 installed at a piping connected to an external water supply unit 300b to control their operations.

In this connection, the second controller 1270, as described above, may be electrically connected to the first controller 1180 to perform the control operation based on a control signal from the first controller 1180. In one embodiment, the first controller 1180 may control the operation of the start-up module 1200 via the second controller 1270 based on the temperature of the fuel-cell stack 1110 or the first reformer 1120 sensed from the temperature sensor 1160. For example, the first controller determines whether to shut off the reformed fuel supply from the start-up module 1200 based on the temperature of the fuel-cell stack 1110 or the first reformer 1120 sensed from the temperature sensor 1160. Further, when the first controller intends to shut off the reformed fuel supply from the start-up module 1200, the first controller may deactivate the second fuel supply device 1220, the second air supply device 1230, and the water pump 1250 via the second controller 1270, and close the first to third valves 1281, 1282, and 1290. In this connection, even when an abnormality occurs in the fuel-cell stack 1100 or the start-up module 1200, the first controller 1180 may deactivate the second fuel supply device 1220, the second air supply device 1230, and the water pump 1250 via the second controller 1270, close the first to third valves 1281, 1282, and 1290, and control the operation of the fuel-cell stack 1110 based on a predetermined emergency mode.

In one embodiment of the present disclosure, the system module 1100 may further include a connection pipe 1190 branched from a portion of a piping located outside the housing. In this regard, the piping connects the external fuel supply unit 100*a* with the first reformer 1120, or the second heat exchanger 1150. In this connection, a discharge piping of the second reformer 1210 of the start-up module 1200 may be removably coupled to the connection pipe 1190. The connection pipe 1190 and the discharge piping of the second reformer 1210 may be connected via a lock-type piping connector. When the second reformer 1210 includes the partial oxidation reformer or the catalytic partial oxidation reformer, the first reformer 1120 may be heated by the high temperature reformed fuel supplied from the second reformer 1210, such that the reforming reaction by the first reformer 1120 may be improved in the start-up mode of the system module 1100.

In this connection, each of the connection pipe 1190 and the discharge piping of the second reformer 1210 is provided with a valve to prevent the fuel from leaking to the outside during removal, and after separated from the start-up module 1200.

Hereinafter, with reference to FIG. 3, an operating method of the fuel cell system according to an embodiment of the present disclosure will be described in detail.

FIG. 3 is a graph illustrating the operating method of the fuel-cell system according to an embodiment of the present disclosure.

With reference to FIG. 3 along with FIG. 1 and FIG. 2, it was confirmed that, when the start-up module 1200 supplies the reformed fuel to the fuel-cell stack 1110 for a duration from the initial period of the start-up mode of the system module 1100 to a time point when the temperature of the fuel-cell stack 1110 reaches about 500° C. When the fuel supplied from the fuel supply unit 100*a* and reformed by the first reformer 1120 is supplied to the fuel-cell stack 1110 after the temperature of the fuel-cell stack 1110 reaches about 350° C., the temperature of the fuel-cell stack 1110 rises well during the initial period of the start-up mode. Thus, even when the first reformer 1120 alone supplies the reformed fuel, the first reformer 1120 may supply the well-reformed fuel to the fuel-cell stack 1110.

According to the fuel-cell system based on the embodiment of the present disclosure, the start-up module having the second reformer capable of reforming fuel at low temperatures allows the hydrogen-containing fuel to be supplied to the fuel-cell stack during the certain initial period of the start-up mode of the system module. Thus, the anode of the fuel-cell stack may be prevented from being oxidized during the start-up mode. In addition, configuring the start-up module independently so as to be removable from the system module may allow a volume and manufacturing cost of the system module to be reduced compared to a case of having two reformers in the system module and may allow a maintenance of the fuel-cell system to be improved. Further, the volume reduction may allow a heat dissipation efficiency of the heat generated from the fuel-cell stack to be improved.

Although the foregoing description of the present disclosure has been set forth with reference to the preferred embodiments of the present disclosure, those skilled in the art will readily recognize that various modifications and variations may be made in the present disclosure without departing from the spirit and scope of the appended claims.

What is claimed is:

1. A fuel-cell system comprising:
a system module including:
one or more fuel-cell stacks;
a first reformer for converting at least some of a first hydrocarbon fuel into a first hydrogen, and supplying the first hydrogen to the one or more fuel-cell stacks; and
a housing for receiving the one or more fuel-cell stacks, and the first reformer therein; and
a start-up module disposed outside the housing, removably coupled to the system module, and configured to supply a second hydrogen-containing fuel to the one or more fuel-cell stacks until a temperature of the one or more fuel-cell stacks reaches a predetermined temperature,
wherein the start-up module includes a second reformer for producing a second hydrogen from a second hydrocarbon fuel, such that the second reformer discharges the second hydrogen-containing fuel,
wherein the first reformer is connected to an external fuel supply unit and is configured to receive the first hydrocarbon fuel along a first pathway from the external fuel supply unit, to the one or more fuel-cell stacks, and supply the first hydrogen to the one or more fuel-cell stacks along the first pathway, the first pathway including the first reformer and the one or more fuel-cell stacks and does not include the second reformer,
wherein the second reformer is connected to the one or more fuel-cell stacks and is configured to supply the second hydrogen-containing fuel to the one or more fuel-cell stacks along a second pathway from the second reformer, to the one or more fuel-cell stacks, the second pathway including the first reformer, the second reformer, and the one or more fuel-cell stacks,
wherein the fuel-cell system further comprises a fuel supply device disposed along the first pathway, and configured to supply the first hydrocarbon fuel from the external fuel supply unit to the first reformer, and
wherein the start-up module further comprises another external fuel supply unit that is separate from the external fuel supply unit and configured to supply the second hydrocarbon fuel to the second reformer.

2. The fuel-cell system of claim 1, wherein each of the one or more fuel-cell stacks includes a solid oxide fuel-cell (SOFC) stack or a molten carbonate fuel-cell (MCFC) stack, and
wherein the predetermined temperature for the one or more fuel-cell stacks is in a range of 300° C. to 500° C.

3. The fuel-cell system of claim 1, further comprising:
at least one controller configured to, at a first temperature below the predetermined temperature, control the fuel supply device such that the first reformer does not receive the first hydrocarbon fuel.

4. The fuel-cell system of claim 3, wherein the second reformer includes one selected from a group consisting of a steam reformer, a partial oxidation reformer, a catalytic partial oxidation reformer, and an auto-thermal reformer.

5. The fuel-cell system of claim 4, wherein the start-up module further comprises an air supply device configured to supply air to the second reformer.

6. The fuel-cell system of claim 5, wherein the second reformer includes the steam reformer or the auto-thermal reformer, and
wherein the start-up module further includes a water tank configured to supply steam to the second reformer, and a steam collector configured to collect steam from the second hydrogen-containing fuel discharged from the second reformer.

7. The fuel-cell system of claim 1, wherein the system module further includes:
a temperature sensor configured to sense the temperature of the one or more fuel-cell stacks or a temperature of the first reformer;
a fuel supply device disposed along the first pathway, and configured to supply the first hydrocarbon fuel from the external fuel supply unit to the first reformer; and
at least one controller configured to control the fuel supply device and the start-up module based on the temperature sensed by the temperature sensor,
wherein the at least one controller is further configured to control an amount of the first hydrogen from the first reformer, by controlling the fuel supply device, and an amount of the second hydrogen from the second reformer, by controlling the start-up module, that are supplied to the one or more fuel-cell stacks based on at least one control signal from the at least one controller.

8. The fuel-cell system of claim 1, wherein the system module further includes a connection pipe branched from a portion of a piping located outside the housing,
wherein the piping connects the external fuel supply unit and the first reformer, such as to form a portion of the first pathway, and
wherein a discharge piping for discharging the second hydrogen-containing fuel from the start-up module is removably coupled to the connection pipe, and the discharge piping and the connection pipe form a portion of the second pathway.

9. The fuel-cell system of claim 8, wherein each of the connection pipe and the discharge piping is provided with a valve configured to open and close the connection pipe and the discharge piping, respectively.

10. The fuel-cell system of claim 3, wherein the at least one controller is configured to control the fuel supply device and the start-up module such that, at a second temperature higher than the predetermined temperature, the first hydrogen is supplied to the one or more fuel-cell stacks, via the first reformer, while the second hydrogen is not supplied to the one or more fuel-cell stacks.

11. The fuel-cell system of claim 10, wherein the predetermined temperature for the one or more fuel-cell stacks is in a range of 300° C. to 500° C.

12. The fuel-cell system of claim 10, wherein the at least one controller is further configured to control the fuel supply device and the start-up module such that, at a third temperature higher than the predetermined temperature and lower than the second temperature, the first reformer receives both the first hydrocarbon fuel, from the external fuel supply unit, and the second hydrogen, from the second reformer, and produces the first hydrogen.

13. A fuel-cell system comprising:
a system module including:
at least one fuel-cell stack; and
a first reformer configured to convert a first hydrocarbon fuel into a first hydrogen, and supply the first hydrogen to the at least one fuel-cell stack; and
a start-up module including a second reformer configured to convert a second hydrogen-containing fuel into a second hydrogen, and supply the second hydrogen to the at least one fuel-cell stack until a temperature of the at least one fuel-cell stack reaches a predetermined temperature,
wherein the first reformer is connected to an external fuel supply unit and is configured to receive the first hydrocarbon fuel along a first pathway from the external fuel supply unit, to the at least one fuel-cell stack, and supply the first hydrogen to the at least fuel-cell stack along the first pathway, the first pathway including the first reformer and the at least fuel-cell stack and does not include the second reformer,
wherein the second reformer is connected to the at least one fuel-cell stack and is configured to supply the second hydrogen-containing fuel to the at least one fuel-cell stack along a second pathway from the second reformer, to the at least one fuel-cell stack, the second pathway including the first reformer, the second reformer, and the at least one fuel-cell stack, and
wherein the fuel-cell system further comprises:
a fuel supply device disposed along the first pathway, and configured to supply the first hydrocarbon fuel from the external fuel supply unit to the first reformer;
another external fuel supply unit that is separate from the external fuel supply unit and configured to supply the second hydrocarbon fuel to the second reformer; and
at least one controller configured to, at a first temperature below the predetermined temperature, control the fuel supply device such that the first reformer does not receive the first hydrocarbon fuel while the at least one fuel-cell stack receives the second hydrogen-containing fuel from the second reformer, via the first reformer.

14. The fuel-cell system of claim 13, wherein the system module further includes a temperature sensor configured to sense the temperature of the at least one fuel-cell stack or a temperature of the first reformer,
wherein the at least one controller is configured to control the fuel supply device and the start-up module based on the temperature sensed by the temperature sensor, and
wherein the at least one controller is further configured to control an amount of the first hydrogen and/or the second hydrogen supplied to the at least one fuel-cell stack, by controlling the fuel supply device and/or the start-up module, based on at least one control signal from the at least one controller.

15. The fuel-cell system of claim 13, wherein the at least one controller is configured to control the fuel supply device and the start-up module such that, at a second temperature higher than the predetermined temperature, the first hydrogen is supplied to the at least one fuel-cell stack, via the first reformer, while the second hydrogen is not supplied to the at least one fuel-cell stack.

16. The fuel-cell system of claim 15, wherein the predetermined temperature for the at least one fuel-cell stack is in a range of 300° C. to 500° C.

17. The fuel-cell system of claim 15, wherein the at least one controller is further configured to control the fuel supply device and the start-up module such that, at a third temperature higher than the predetermined temperature and lower than the second temperature, the first reformer receives both the first hydrocarbon fuel, from the external fuel supply unit, and the second hydrogen, from the second reformer, and produces the first hydrogen.

* * * * *